United States Patent [19]

Yasuda et al.

[11] Patent Number: 4,949,120
[45] Date of Patent: Aug. 14, 1990

[54] ILLUMINATING DEVICE

[75] Inventors: Yuji Yasuda, Tokyo; Tetsuya Fujioka, Yokohama, both of Japan

[73] Assignee: Ricoh Company, Ltd., Tokyo, Japan

[21] Appl. No.: 340,467

[22] Filed: Apr. 19, 1989

[30] Foreign Application Priority Data

Apr. 21, 1988 [JP] Japan ................................ 63-99151
Apr. 21, 1988 [JP] Japan ................................ 63-99152
Jul. 11, 1988 [JP] Japan ................................ 63-172468

[51] Int. Cl.⁵ .................................................. G03B 27/54
[52] U.S. Cl. ..................................................... 355/67
[58] Field of Search ................... 355/67; 362/346, 343, 362/349, 303, 296, 216, 342, 228, 299

[56] References Cited

U.S. PATENT DOCUMENTS 4,225,923 9/1980 Bloemendaal et al. ........... 355/67 X
4,568,179 2/1986 Durbin et al. .......................... 355/67
4,747,033 5/1988 Yasuda ............................. 355/67 X Primary Examiner—Richard A. Wintercorn
Attorney, Agent, or Firm—Oblon, Spivak, McClelland, Maier & Neustadt

[57] ABSTRACT

An illuminating device for use with an imagewise exposing arrangement of an electrophotographic copier, electrostatic printer or similar image recording equipment. A delimited area of a glass platen is illuminated by a light source and a main reflector which is implemented by a mirror. The main reflector is located outside of one end of the delimited area. Three auxiliary reflectors are individually associated with, among four sides which are individually associated with the outer edges of the delimited area, a side facing the one end where the main reflector is provided and two facing sides which adjoin the above-mentioned side. Light reflected by the main reflector is redirected by the auxiliary reflectors toward the delimited area.

9 Claims, 6 Drawing Sheets

ILLUMINATING DEVICE

BACKGROUND OF THE INVENTION

The present invention relates to an illuminating device capable of illuminating an object uniformly and with improved efficiency and applicable to an electrophotographic copier, electrostatic printer or similar image recording equipment of the type illuminating the entire surface of an object at a time.

A prerequisite with image recording equipment of the type described is that a photoconductive element be exposed to a document image by uniform illumination over the entire surface thereof. To meet this requirement, some different approaches have been proposed such as increasing the illumination around an area to be illuminated in consideration of the cosine fourth-power rule of a lens, and disposing a correcting filter or similar element on an optical path while uniformizing imagewise light incident to a lens. With the second-mentioned approach, it is necessary to uniformly illuminate an expected area when the diffuse reflection of the surface of a document is uniform. An implementation for such uniform illumination is disclosed in Japanese Patent Laid-Open Publication (Kokai) No. 61-93501. The device disclosed in this Laid-Open Publication is made up of a light source, and a main mirror having a reflecting surface implemented as a surface of revolution. The axis of revolution of the reflecting surface is positioned outside of one end of an area to be illuminated and is coaxial with the center of the light source and perpendicular to a flat portion of the expected area. The configuration of the reflecting surface is such that light issuing from the light source is reflected toward the flat portion with a luminous flux density which is proportional to the distance as measured from the axis of revolution. Although this kind of illuminating device is successful in illuminating a flat area uniformly, it cannot achieve a satisfactory illuminating effect because the reflection from the main mirror is emanated radially. More specifically, not the whole light is used to illuminate the desired area, i.e., a part of the light is emanated to the outside of the desired area.

Apart from the specific construction described above, when a main mirror is located at one end of an area to be illuminated which is rectangular and flat, the illumination efficiency is lowered substantially by the light which misses the expected area due to the emanation of the reflection.

SUMMARY OF THE INVENTION

It is therefore an object of the present invention to provide an illuminating device which enhances efficient illumination.

It is another object of the present invention to provide an illuminating device capable of illuminating the entire surface of a desired object uniformly.

It is another object of the present invention to provide a generally improved illuminating device.

A device for illuminating a square flat area of the present invention comprises a light source, a main reflector located outside of one end of the area and having a reflecting surface for reflecting light issuing from the light source, and auxiliary reflectors located at outer edges of the area and each having a reflecting surface for directing light reflected by the reflecting surface of the main reflector toward the area.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
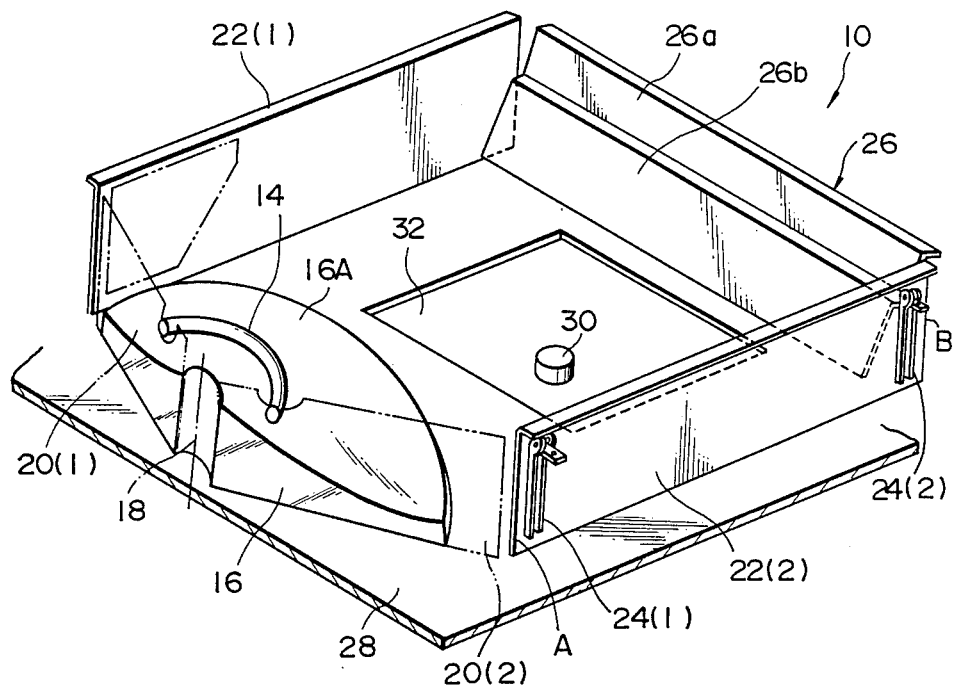
FIG. 1 is a perspective view of an illuminating device embodying the present invention, a glass platen being omitted for clarity.
Figure 3:
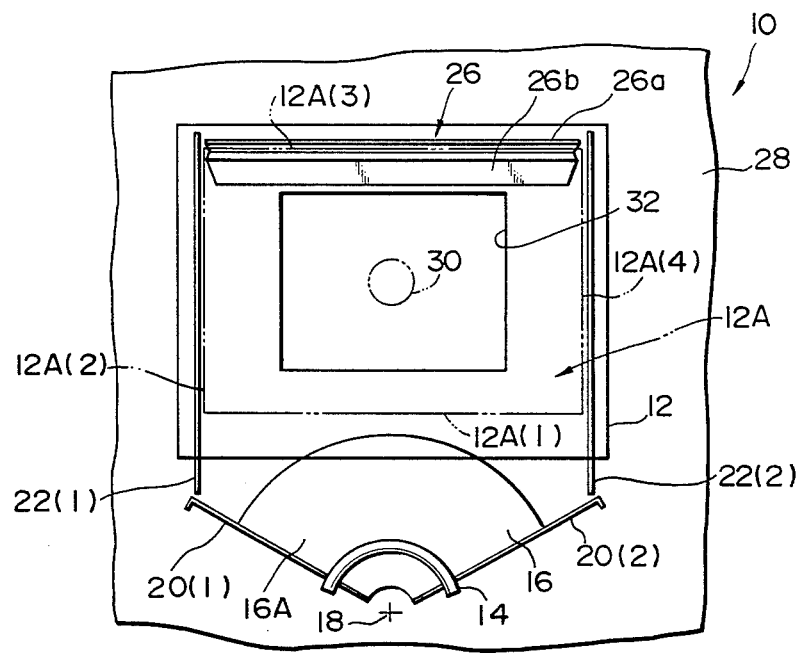
FIG. 3 is a plan view of the device shown in FIG. 1.

Referring to FIG. 1 of the drawings, an illuminating device embodying the present invention is shown and generally designated by the reference numeral 10. The illuminating device 10 is applied to an electrophotographic copier which belongs to a family of image recording equipment to which the present invention pertains. In the figure, a square glass platen 12 shown in FIG. 3 is omitted for clarity. The glass platen 12 is fringed by metal fixtures and has a square flat illumination area 12A defined on its upper surface. Located adjacent to and outside of one end of the illumination area 12A are an arcuate light source 14 and a main reflector in the form of a mirror 16 having a curved reflecting surface 16A. The main reflector 16 is disposed below the light source 14.

As shown in FIG. 1, the reflecting surface 16A of the main reflector 16 is implemented as a surface of revolution whose center of revolution is defined by an axis 18. This axis 18 is the same as the axis through which the center of curvature of the light source 14 extends. The axis 18 is located outside of one end of the glass platen 12 and is perpendicular to the flat illumination area 12A. To illuminate the area 12A uniformly, the reflecting surface 16A is so shaped as to reflect light issuing from the light source 14 toward the area 12A in a luminous flux density which is proportional to the distance as measured from the axis 18.

As shown in FIGS. 1 and 3, side reflectors 20(1) and 20(2) are individually mounted on two radially extending edges of the generally sectorial main reflector or mirror 16. The side reflectors 20(1) and 20(2) serve to increase the utilization efficiency of a reflection from the main reflector 16 which is defined by an arc of 120 degrees, whereby a reflecting effect achievable with 360-degree reflection is provided artificially. Auxiliary reflectors 22(1) and 22(2) are individually provided on two opposite sides 12A(2) and 12A(4) of four sides 12A(1), 12A(2), 12A(3) and 12A(4) which delimit the illumination area 12A, the sides 12A(2) and 12A(4) being contiguous with the side 12A(1) which is adjacent to the main reflector 16. As shown in FIG. 1, each of the auxiliary reflectors 22(1) and 22(2) is located outside of the illumination area 12A and retained in a substantially perpendicular position by holders 24(1) and 24(2). Further, an auxiliary reflector 26 is provided on the side 12A(3) of the illumination area 12A which faces the side 12A(1). The auxiliary reflector 26 is provided with a stepped configuration, i.e., it is made up of an upper reflecting part 26a and a lower reflecting part 26b. The upper and lower reflecting parts 26a and 26b are located outside of and inside of the area 12A, respectively, and each is inclined relative to the glass platen 12. The main reflector 16 is securely mounted on a base 28. That part of the base 28 which is located just below the area 12A is formed with an opening 32 for guiding a reflection from a document which is laid on the glass platen 12 toward a lens 30.

Figure 2:
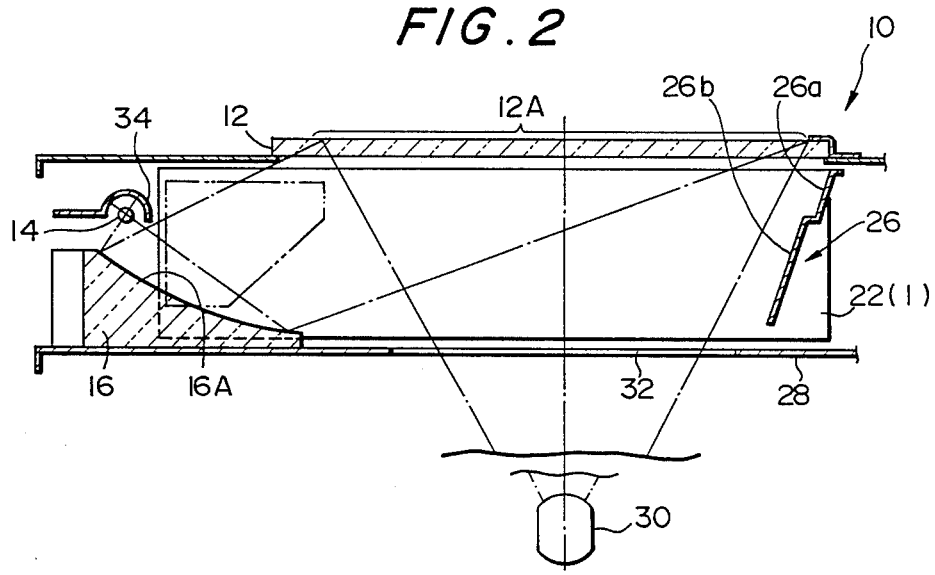
FIG. 2 is a section of the device shown in FIG. 1.

As shown in FIG. 2, when the light source 14 is turned on, light issuing upward from the light source 14 is returned toward the light source 14 by a reflector 34 of the latter. This part of the light is reflected by the reflecting surface 16A of the main reflector 16 together with light which issues downward from the light source 18, thereby being directed to a document (not shown) laid on the glass platen 12. A reflection from the document is propagated through the lens 30 to be focused on a particular surface to be illuminated (not shown). Assuming that the auxiliary reflectors 22(1), 22(2) and 26 are absent, the range of the upper surface (document surface) of the glass platen 12 and its extension to be illuminated by the main reflector 16 is sectorial, as designated by the reference numeral 36 in FIG. 4. More specifically, the reflection from the main reflector 16 extends far beyond the right and left sides of the effective illumination area 12A and the side which faces the light source 14, resulting in low light utilization efficient. In this respect, the auxiliary reflectors 22(1) and 22(2) reflect those parts of the reflection from the main reflector 16 which would otherwise extend beyond the sides 12A(2) and 12A(4) of the area 12A toward the area 12A, thereby increasing the illumination in the area 12A. Likewise, the auxiliary reflector 26 reflects that part of the reflection from the main reflector 16 which would otherwise extend beyond the side 12A(3) of the area 12A toward the area 12A, also contributing to the increase in the illumination. This reflector 26 has the upper and lower reflecting parts 26a and 26b as previously mentioned and therefore further enhances efficient illumination.

Figure 4:
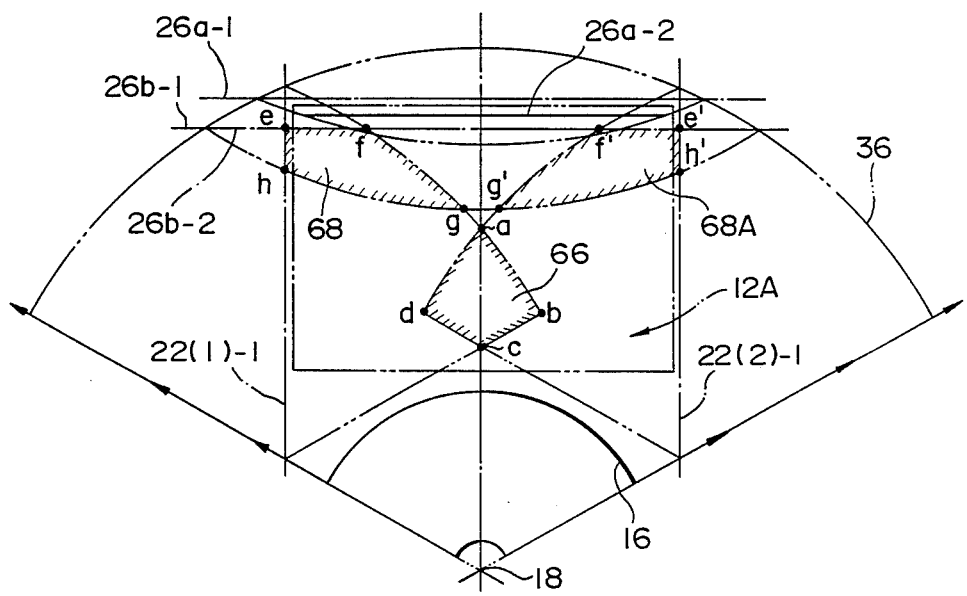
FIG. 4 a diagram showing a range of reflection.

In FIG. 4, lines 22(1)-1, 22(2)-1, 26a-1 and 26b-1 are representative of the turns where the light from the main reflector 16 is reflected by the auxiliary reflectors 22(1), 22(2), 26a and 26b, respectively. The reflection from the main reflector 16 is turned back into the illumination area 12A at those lines, producing overlapping regions in the area 12A. In FIG. 4, the reflecting regions associated with the auxiliary reflectors 22(1), 22(2) and 26 are indicated on the assumption that the auxiliary reflectors are perpendicular to the surface of the glass platen 12, for the simplicity of illustration. Further, lines 26a-2 and 26b-1 are representative of borders between the upper and lower reflecting parts 26a and 26b of the stepped auxiliary reflector 26, no reflection occurring in the region delimited by the lines 26a-2 and 26b-1.

Figure 5A:
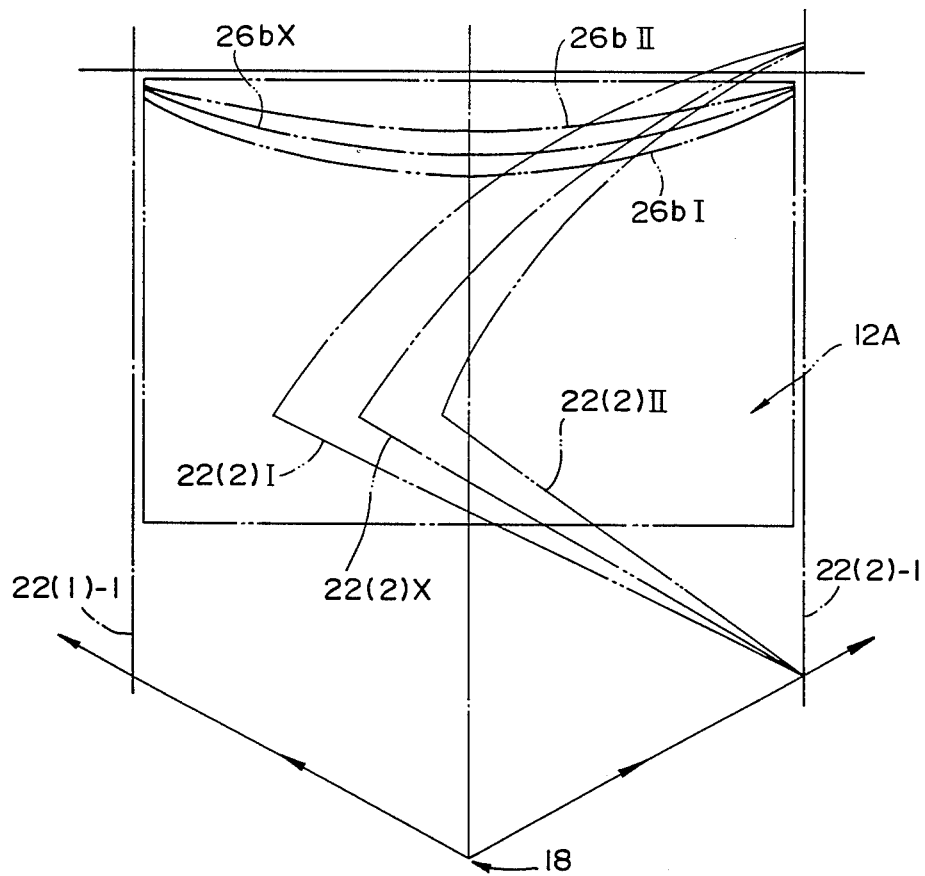
FIGS. 5A and 5B are diagrams demonstrating how the range of reflection varies with the inclination of a reflecting surface.
Figure 5B:
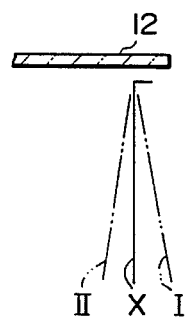

In order that not only the efficient illumination of the area 12A but also a uniform illumination distribution may be achieved, the auxiliary reflectors 22(1), 22(2) and 26 should advantageously be inclined relative to the glass platen 12. This will be described taking the auxiliary reflector 22(2) as an example. As shown in FIG. 5A, assume that when the reflector 22(2) is held in a vertical position (labeled X in FIG. 5B) perpendicular to the glass platen 12, a reflection from the reflector 22(2) illuminates a region 22(2)X of the glass platen 12. When the reflector 22(2) is inclined from the vertical position X to a position I shown in FIG. 5B, it illuminates a region 22(2)I of the glass platen 12 resulting in an increase in the illuminating region and in a decrease in illumination per unit area. Conversely, when the reflector 22(2) is inclined to a position II shown in FIG. 5B, it illuminates a region 22(2)II of the glass platen 12 resulting in a decrease in the illuminating region and in an increase in illumination per unit area.

Likewise, the illuminating region defined on the glass platen 12 by the auxiliary reflector 26 varies with the inclination of the reflector 26 relative to a position perpendicular to the glass platen, as represented by regions 26BI and 26bII in FIG. 5A. It will therefore be seen that an irregular illumination distribution can be corrected by adjusting the inclination of the individual auxiliary reflectors 22(1), 22(2) and 26. Especially, the effect attainable with the inclination of the auxiliary reflector 22(1) and 22(2) is considerable in terms of area. Hence, if each of the auxiliary reflectors 22(1) and 22(2) is bodily made of an elastic material so as to be variable in inclination at both longitudinal ends A and B (see FIG. 1) independently, i.e., in a twisting manner, the associated illuminating region on the glass platen 12 can be varied with some degree of freedom to thereby further enhance the effect of adjustment.

Figure 6:
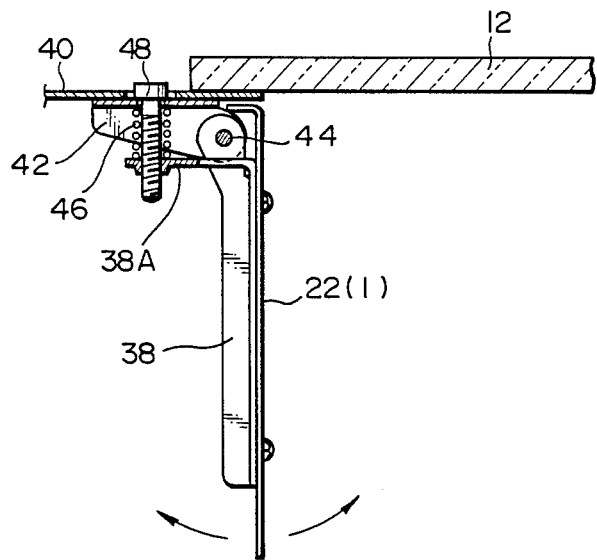
FIGS. 6 and 7 are views each showing a specific construction of means for adjusting the inclination of an auxiliary reflector.

Referring to FIG. 6, a specific construction of a mechanism for adjusting the angular position of any of the auxiliary reflectors 22(1), 22(2) and 26 is shown. The mechanism will be described taking the auxiliary reflector 22(1) by way of example. As shown, the auxiliary reflector 22(1) is retained by a holder 38. The upper end of the holder 38 is journalled by a shaft 44 to a support member 42 which is in turn securely mounted on a base 40 of the glass platen 12. A compression spring 46 and a screw 48 are provided between an arm 38A extending from the holder 38 and the support member 42. Specifically, the screw 48 has a head protruding from the base 40, a neck simply passed through a bent portion of the support member 42, and a tip held in threaded engagement with the arm 38A of the holder 38. When the screw 48 is turned from the outside, the arm 38A is moved up or down so that the holder 38 and therefore the auxiliary reflector 22(1) is bodily moved about the shaft 44 to an adequate angular position. Preferably, the shaft 44 should be located as close to the glass platen 12 as possible to minimize undesirable shaking of the auxiliary reflector 22(1) in the illuminating area 12A.

The mechanism described above with reference to FIG. 6 is similarly applicable to any of other the auxiliary reflectors 22(2) and 26.

Figure 7:
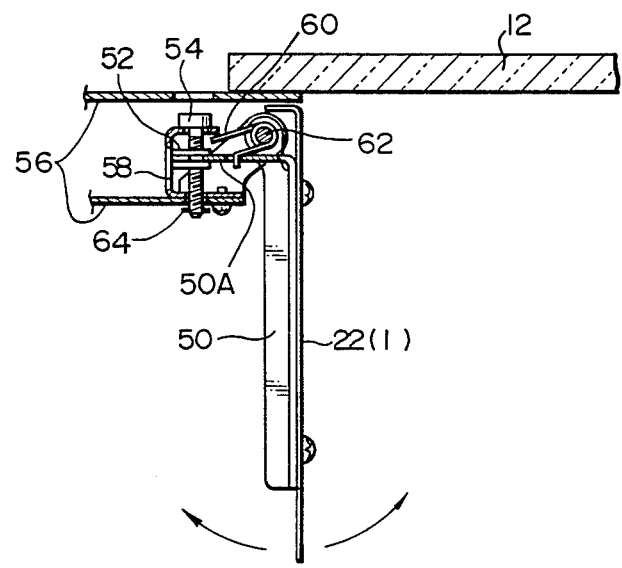

The mechanism shown in FIG. 4 is satisfactory so long as the inclination of the associated auxiliary reflector is comparatively small. However, when it is desired to increase the inclination, the screw 48 is apt to tilt itself. An alternative construction which is free from such a problem is shown in FIG. 7. In FIG. 7, an arm 50A extending from a holder 50 is received in a channel of an adjusting nut 52 at the tip thereof. The nut 52 is held in threaded engagement with a screw 54 and has a part of its circumference cut in a semicircular configuration to be thereby prevented from rotating. The diametrical edge of the semicircular nut 52 is positioned in close proximity to the wall of a support member 58 which is joined with a base 56. A torsion spring 60 is fitted on a shaft 62 and preloaded to bias the arm 50A and the upper end of the support member 58 away from each other, whereby the holder 50 is constantly biased in one direction and thereby protected against shaking. A retaining ring 64 is fitted on the lower end of the screw 54. When an external force acts on the screw 64 in the event of cleaning, for example, the retaining ring 64 prevents the screw 64 from slipping off. In this construction, the arm 50A is displaced by the movement of the adjusting nut 52 which is caused by the rotation of the screw 52, so that the screw 52 is prevented from tilting. Hence, the construction of FIG. 7 is advantageous over that of FIG. 6 with respect to the adjustable range of the angular position of the auxiliary reflector 22(1).

Each of the auxiliary reflectors 22(1), 22(2) and 26 is provided with any of the mechanisms shown in FIGS. 6 and 7 at both ends thereof with respect to the longitudinal direction. This allows any of the auxiliary reflectors 22(1), 22(2) and 26 to be inclined relative to the glass platen 12 by different angles at both ends thereof. More specifically, the auxiliary reflector can be twisted to achieve a uniform and efficient illuminating effect in conformity with actual conditions. In order that the auxiliary reflector may be twistable as stated, it is preferably made of a material having an adequate degree of elasticity such as bright aluminum (t=1). Glass is not suitable for implementing such a property of the auxiliary reflector. The thickness of the auxiliary reflector should not be too thick or too thin.

Figure 8:
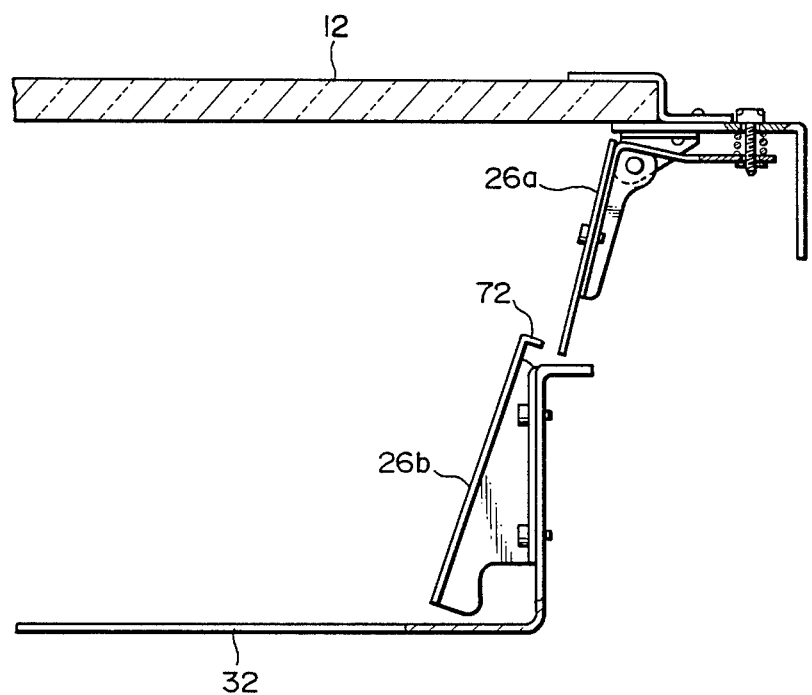
FIG. 8 is a view showing how the auxiliary reflector which faces a main reflector is mounted and means for adjusting the angular position of the auxiliary reflector.

The auxiliary reflector 26 will be described in detail. The auxiliary reflector 26 is composed of the upper and lower reflecting parts 26a and 26b, as stated earlier. The illumination and other similar factors are more effected by the angular position of the upper reflecting part 26a than by that of the lower reflecting part 26b, because the reflecting part 26a is closer to the glass platen 12 than the reflecting part 26b. The influence of a change in the angular position of the auxiliary reflector 26 sequentially decreases with the increase in the distance as measured from the glass platen 12, due to the diffusion of light. Considering such a characteristic, only the upper reflecting part 26a may be arranged to be adjustable in inclination, while the lower reflecting part 26b may be fixed in place, as shown in FIG. 8. The construction shown in FIG. 8 is essentially similar to that of FIG. 6, and details thereof will not be described to avoid redundancy. The adjusting mechanism shown in any of FIGS. 6 and 7 is applied to the upper reflecting part 26a. Concerning the angle, the upper and lower reflecting parts or plates 26a and 26b should basically be inclined respectively by 85 degrees and 82 degrees. Experiments showed that the preferable range of inclination is substantially 87 degrees to 80 degrees for the upper reflecting plate 26b and substantially 84 degrees to 78 degrees for the lower reflecting plate 26b. Inclinations not lying in such ranges resulted in noticeably irregular illumination distributions or short illumination. Concerning the auxiliary reflectors 22(1) and 22(2), a preferable range of inclination was found to be substantially 95 degrees to 75 degrees.

In all of the constructions shown in FIGS. 6, 7 and 8, the auxiliary reflectors 21(1), 21(2) and 26 can be adjusted in inclination by turning their associated screws from the outside, i.e., without removing the glass platen 12. The adjustment can therefore be performed while producing copies. This promotes the ease of assembly, adjustment, and maintenance. It has been customary to the adjust the position of a lamp or, in a slit exposure type copier, to adjust the position of a screening plate. All these conventional schemes cannot be implemented unless the main switch of the equipment is turned off to insure safety operations, then the glass platen is removed, and then a trial-and-error procedure is repeated by producing a copy, leaving a critical problem in the adjustment efficiency aspect. Further, considering the fact that the adjustment is necessary not only at the assembly stage but also in the event when the lamp is replaced or deteriorated and when a reflector associated with the lamp is contaminated, the constructions shown in FIGS. 6, 7 and 8 are extremely practical.

Figure 9:
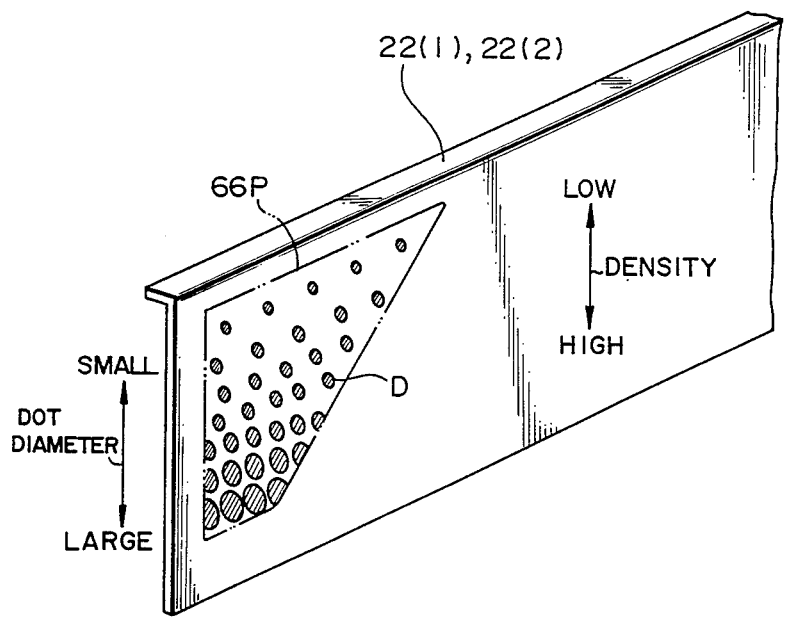
FIGS. 9 and 10 are views each showing the configuration of a low reflectance area.

An alternative implementation for coping with an irregular illumination distribution will be described. In brief, the implementation consists in providing the auxiliary reflector with low reflectance regions. Specifically, in FIG. 4, the illumination is higher in the light overlapping regions, i.e., a region 66 defined by points a, b, c and d, a region 68 defined by points e, f, g and h, and a region 68A defined by points e', f', g' and h'. The region 66 is derived from a particular portion of each of the auxiliary reflector 22(1) and 22(2). This particular portion is represented by a generally trapezoidal area 66P in FIG. 9. In the light of this, black dots D are printed in the particular area 66P of each auxiliary reflector 33(1) or 22(2) so as to reduce the reflectance. The diameter and density of the dots are selected such that comparatively low reflectance (less than 50 percent) is set up in a part of the area 66P which is remote from the glass platen 12, while the reflectance of a part which is close to the glass platen 12 is higher than the part remote from the glass platen 12. This is to lower the reflectance in the area where the intensity of illumination is high (i.e. close to the light source with respect to the propagation of light). For example, dots may be printed in the part close to the glass platen 12 with a diameter of 1 millimeter and a pitch of 6 to 7 millimeters and in the part remote from the glass platen 12 with a diameter of 1.6 millimeters and a pitch of 2 millimeters in the horizontal direction and 1.5 millimeters in the vertical direction, in a zig-zag configuration each. In such a case, both of the pitch and diameter are sequentially changed. It was proved by experiments that dots having diameters of 6 to 4 millimeters and printed in the area close to the glass platen 12 undesirably appear as a dapple pattern on an area to be illuminated. Hence, the dot diameter should be as small as possible and preferably be 0.8 millimeter to 2.5 millimeters in the aspect of actual printing and accuracy.

Figure 10:
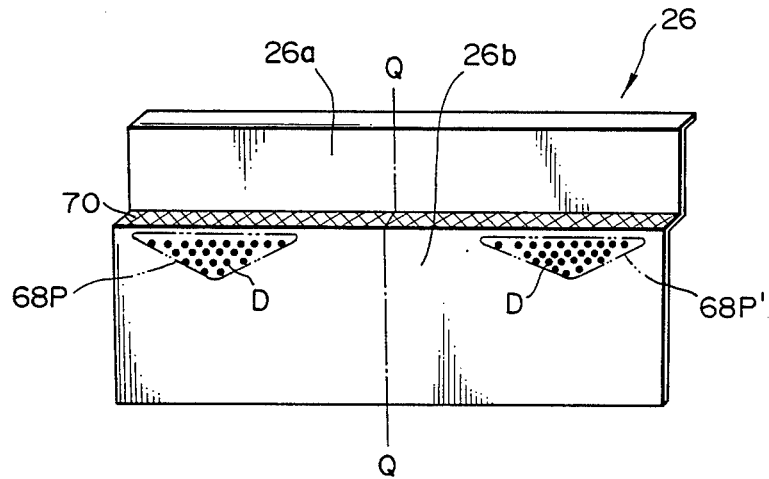

The overlapping regions 68 and 68A are associated with particular portions of the lower reflecting part 26b which is coactive with the upper reflecting part 26a. These particular portions are represented by generally triangular areas 68P and 68P' in FIG. 10 which are symmetrical to each other with respect to the center line Q—Q of the auxiliary reflector 26. As shown in FIG. 10, the upper and lower reflecting parts 26a and 26b are interconnected by a webbing 70 (a portion labeled 72 in FIG. 8). Since the webbing 70 is substantially parallel to the glass platen 12, light reflected by the webbing 70 is incident to the glass platen 12 and therefore constitutes a cause of glare which is incident to the lens 30. To eliminate this glare, a non-reflective coating or a tape, for example, may be applied to the webbing 70.

In summary, it will be seen that the present invention provides an illuminating device which enhances efficient illumination and, yet, eliminates an irregular illumination distribution.

Various modifications will become possible for those skilled in the art after receiving the teachings of the present disclosure without departing from the scope thereof.

What is claimed is:

1. A device for illuminating a square flat area, comprising:
    a light source;
    main reflector means located outside of one end of said area and having a reflecting surface for reflecting light issuing from said light source; and
    auxiliary reflector means located at an outer edge of said area and having a reflecting surface for directing light reflected by said reflecting surface of said main reflector means toward said area,
    said reflecting surface of said main reflector means being shaped to reflect the light from said light source toward said area in a luminous flux density which is proportional to a distance as measured from said light source, said main reflector means comprising a sectorial mirror having a side reflecting surface at each of two radial edges of said mirror, said side reflecting surfaces constituting said reflecting surface.

2. A device as claimed in claim 1, wherein said auxiliary reflector means comprises a first and a second auxiliary reflector each being associated with, among four sides which are individually associated with the outer edges of said area, respective one of two sides which face each other and adjoin a side adjacent to the one end where said main reflector means is provided.

3. A device for illuminating a square flat area, comprising:
    a light source;
    main reflector means located outside of one end of said area and having a reflecting surface for reflecting light issuing from said light source; and
    auxiliary reflector means located at an outer edge of said area and having a reflecting surface for directing light reflected by said reflecting surface of said main reflector means toward said area,
    said auxiliary reflector means comprising a first and a second auxiliary reflector each being associated with, among four sides which are individually associated with the outer edges of said area, respective one of two sides which face each other and adjoin a side adjacent to the one end where said main reflector means is provided, each of said first and said auxiliary reflectors comprising a low reflectance surface for lowering a reflectance of said auxiliary reflector, said low reflectance surface constituting a part of said reflecting surface.

4. A device as claimed in claim 3, wherein said auxiliary reflector means further comprises a third auxiliary reflector associated with, among four sides which are individually associated with the outer edges of said area, a side facing a side adjacent to the one end where said main reflector means is provided.

5. A device as claimed in claim 4, wherein said third auxiliary reflector comprises a low reflectance surface for lowering reflectance of said auxiliary reflector, said low reflectance surface constituting a part of said reflecting surface.

6. A device for illuminating a square flat area, comprising:
    a light source;
    main reflector means located outside of one end of said area and having a reflecting surface for reflecting light issuing from said light source; and
    auxiliary reflector means located at an outer edge of said area and having a reflecting surface for directing light reflected by said reflecting surface of said main reflector means toward said area,
    said auxiliary reflector means comprising a first auxiliary reflector associated with, among four sides which are individually associated with the outer edges of said area, a side facing a side adjacent to the one end where said main reflector means is provided, said first auxiliary reflector comprising a low reflectance surface for lowering reflectance of said auxiliary reflector, said low reflectance surface constituting a part of said reflecting surface.

7. A device as claimed in claim 6, wherein said auxiliary reflector means further comprises a second and a third auxiliary reflector each being associated with, among four sides which are individually associated with the outer edges of said area, respective one of two sides which face each other and adjoin a side adjacent to the one end where said main reflector means is provided.

8. A device as claimed in claim 7, each of said second and third auxiliary reflectors comprises a low reflectance surface for lowering a reflectance of said auxiliary reflector, said low reflectance surface constituting a part of said reflecting surface.

9. A device for illuminating a square flat area, comprising:
    a light source;
    main reflector means located outside of one end of said area and having a reflecting surface for reflecting light issuing for said light source; and
    auxiliary reflector means located at an outer edge of said area and having a reflecting surface for directing light reflected by said reflecting surface of said main reflector means toward said area, said auxiliary reflector means comprising a plurality of reflectors each being made of an elastic material.

* * * * *